United States Patent
Giering et al.

(10) Patent No.: US 9,469,145 B2
(45) Date of Patent: Oct. 18, 2016

(54) SECURITY FEATURE HAVING SEVERAL COMPONENTS

(71) Applicant: GIESECKE & DEVRIENT GMBH, Munich (DE)

(72) Inventors: Thomas Giering, Kirchseeon (DE); Johann Kecht, Munich (DE); Stephan Steinlein, Munich (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 151 days.

(21) Appl. No.: 14/364,737

(22) PCT Filed: Dec. 19, 2012

(86) PCT No.: PCT/EP2012/005277
§ 371 (c)(1),
(2) Date: Jun. 12, 2014

(87) PCT Pub. No.: WO2013/091860
PCT Pub. Date: Jun. 27, 2013

(65) Prior Publication Data
US 2014/0319818 A1    Oct. 30, 2014

(30) Foreign Application Priority Data

Dec. 23, 2011  (DE) .......... 10 2011 122 246

(51) Int. Cl.
| C09D 5/22 | (2006.01) |
| D21H 21/48 | (2006.01) |
| B41M 3/14 | (2006.01) |
| B42D 15/00 | (2006.01) |
| B42D 25/29 | (2014.01) |

(52) U.S. Cl.
CPC .......... B42D 15/0013 (2013.01); D21H 21/48 (2013.01); B41M 3/144 (2013.01); B42D 25/29 (2014.10)

(58) Field of Classification Search
CPC ...... C09K 11/025; C09D 5/22; B41M 3/144; B42D 25/36; B42D 25/382
See application file for complete search history.

(56) References Cited

U.S. PATENT DOCUMENTS

| 3,980,887 A | 9/1976 | Mattis et al. |
| 3,981,819 A | 9/1976 | Yocom et al. |
| 4,014,812 A | 3/1977 | Kelsey, Jr. et al. |
| 4,452,843 A | 6/1984 | Kaule et al. |
| 4,463,970 A * | 8/1984 | Kaule ............... B41M 3/144 283/72 |
| 6,200,628 B1 * | 3/2001 | Rozumek ............ B41M 3/14 427/197 |
| 6,344,261 B1 | 2/2002 | Kaule et al. |
| 6,802,992 B1 | 10/2004 | Wieczoreck et al. |
| 8,277,612 B2 | 10/2012 | Kane et al. |
| 8,663,820 B2 | 3/2014 | Giering et al. |
| 2004/0105962 A1 | 6/2004 | Giering et al. |
| 2009/0159510 A1 | 6/2009 | Haushalter et al. |
| 2011/0146930 A1 | 6/2011 | Kane et al. |
| 2013/0193346 A1 * | 8/2013 | Justel ............ C09K 11/7733 250/459.1 |

FOREIGN PATENT DOCUMENTS

| DE | 3048734 A1 | 7/1982 |
| DE | 19804021 A1 | 8/1999 |
| DE | 10056462 A1 | 5/2002 |
| DE | 10111116 A1 | 9/2002 |
| EP | 0966504 B1 | 11/2005 |
| EP | 1647946 * | 4/2006 |
| WO | 81/03507 A1 | 12/1981 |
| WO | 2006/047621 A1 | 5/2006 |
| WO | 2011/084663 A2 | 7/2011 |
| WO | WO 2011/098083 * | 8/2011 |

OTHER PUBLICATIONS

International Search Report from International PCT Application No. PCT/EP2012/005277, May 29, 2013.
International Preliminary Report on Patentability from International PCT Application No. PCT/EP2012/005277, Jun. 24, 2014.

* cited by examiner

Primary Examiner — Carol M Koslow
(74) Attorney, Agent, or Firm — Workman Nydegger

(57) ABSTRACT

The invention relates to a security feature having a luminescent component and a component camouflaging the luminescent component. The invention starts out from a security feature having a luminescent component having at least one luminophore consisting of at least one doped host lattice, and a component camouflaging the luminescent component, wherein the camouflaging component has chemical elements that have similar structure-chemical properties to the chemical elements of the luminescent component, wherein the chemical elements of the camouflaging component and the chemical elements of the luminescent component are formed by different chemical elements.

16 Claims, No Drawings

SECURITY FEATURE HAVING SEVERAL COMPONENTS

BACKGROUND

This invention relates to a security feature having a luminescent component and a component camouflaging the luminescent component.

The designation "value document" is to be understood within the framework of the invention to refer to bank notes, checks, shares, tokens, identity cards, credit cards, passports and also other documents as well as labels, seals, packages or other elements for product authentication.

Securing value documents against forgery by means of security features having a luminescent component has been known for a long time. The luminescent component is formed here by substances which will hereinafter also be designated luminophores and are formed by host lattices doped with transition metals or rare earth metals as luminescent ions (the term matrix hereinafter also being employed for host lattice). Such ions have the advantage that, after being suitably excited, they show one or more characteristic narrow-band luminescences which facilitate a reliable detection and the delimitation over other spectra. For doping, combinations of transition metals and/or rare earth metals have also been discussed. Such substances have the advantage that, in addition to the above-mentioned luminescences, one can observe so-called energy transfer processes, which can lead to more complicated emission spectra. In such energy transfer processes, an ion can transfer its energy to another ion and the spectra can then consist of several narrow-band lines which are characteristic of both ions.

The stated security features for securing value documents have as a luminescent component individual luminophores whose emissions differ with regard to their spectral and/or temporal properties. The security features are incorporated into and/or applied to value documents in different forms of use. There can also be employed for the luminescent component a combination of luminophores. The emission bands of the employed luminophores constitute a spectral coding. Several different luminophores can be combined into systems, with the individual systems being independent of each other. The emission of the employed luminophores is also designated luminescence, whereby this may involve fluorescence and/or phosphorescence.

It is also known that the described security features are not formed solely by the luminescent component. As a further component, some security elements have a component that is used for camouflaging the luminescent component. For example, DE 30 48 734 A1 describes a security paper having camouflage substances protecting the authentication features. The camouflage substances of the camouflaging components correspond here substantially to the luminescent components, i.e. very similar or like-kind host lattices and dopants are employed for both the luminescent component and the camouflaging component. However, when manufacturing the camouflage substances for the camouflaging component it is made sure that the camouflage substances have no luminescent properties. For this purpose, parameters in the annealing or grinding process are for example changed for the camouflaging component in contrast to the manufacture of the luminescent component. Alternatively, so-called luminescence killers are employed. This prevents the luminescent component from being distinguished from the camouflaging component using conventional methods of analysis technology. By this means, primarily the position of the luminescent component is concealed, since it cannot be distinguished from the camouflaging component using conventional methods.

Since the luminescent and camouflaging components involve very similar or even the same substances, no camouflage of the substance-based identity of the luminescent component is obtained, since the employment of the camouflaging component increases the total examinable quantity of material of the security feature in the value document to be secured, thereby tending to facilitate rather than impede the analyzability of the security feature or the luminescent component.

SUMMARY

Starting out from this prior art, the invention is based on the object of specifying a security feature having a luminescent component and a component camouflaging the luminescent component for incorporation into and/or application to value documents wherein the analysis of the kind and the doping of a host lattice employed for the luminescent component is to be prevented or at least substantially impeded. It is primarily intended here that a camouflage of the luminescent component be obtained with regard to an elemental analysis. The identification of the luminescent component is also to be impeded in case the security feature is present in pure form prior to incorporation into value documents or by ashing of authentic value documents, and can then be examined by means of elemental analysis methods such as XRF (X-ray fluorescence analysis) or ICP-AES (inductively coupled plasma optical emission spectrometry).

The invention starts out from a security feature having a luminescent component having at least one luminophore consisting of at least one doped host lattice, and a component camouflaging the luminescent component, wherein the camouflaging component has chemical elements that have similar structure-chemical properties to the chemical elements of the luminescent component, wherein the chemical elements of the camouflaging component and the chemical elements of the luminescent component are formed by different chemical elements. The security feature is incorporated into and/or applied to a value document consisting of paper and/or plastic, and may be applied to the value document as an invisible, at least partial coating.

The invention has the advantage that through the employment of a camouflaging component having chemical elements that have similar structure-chemical properties but are different in comparison to the chemical elements of the luminescent component, an especially good camouflage of the luminescent component can be obtained, because the chemical elements additionally employed for camouflage greatly increase the analysis effort. Besides increasing the effort for analysis, the luminescent component can moreover never be specified with complete certainty, since a multiplicity of substances come into consideration due to the similar structure-chemical properties of the chemical elements.

DETAILED DESCRIPTION OF VARIOUS EMBODIMENTS

Security features for value documents having a luminescent component on the basis of NIR luminophores having specific properties in their emission and excitation are known, e.g. from WO 81/03507 A1, EP 0 966 504 B1, WO 2011/084663 A2, DE 198 04 021 A1, DE 101 11 116 A1.

Such security features are normally either added directly in the form of a powder upon manufacture of the substrate, e.g. the paper pulp, of the value document, or the powder is added to a printing ink which is then applied to the substrate later.

The present security feature for value documents consisting of paper and/or plastic, e.g. bank notes, consists of a mixture having several components through which the elemental composition of a luminescent component is camouflaged upon elemental analysis of the bank note or of bank-note ash or of the mixture itself. For this purpose there is employed a camouflaging component which can change the ratio of matrix constituents of the luminescent component and introduces additional chemical elements, so that it is not readily evident which combinations of elements build up the matrix or host lattice of the luminescent component. The camouflaging component is chosen here such that a replication of the security feature, i.e. in particular of its luminescent component, on the basis of detected element constituents is impossible or significantly impeded.

The security feature can have admixed thereto additional components having different functionalities in order to obtain advantageous properties or an elevated security against imitation of the security feature. The additional components may be a production component or a coding component, whose more exact function will be explained hereinbelow. It is possible that the additional components also have an effect corresponding to the effect of the camouflaging component, in order to secure the build-up of the luminescent component further.

The luminophore involved here is one emitting in the non-visible spectral region, consisting of a doped crystalline matrix (host lattice). Preferably, the substances possess high quantum yields or signal intensities and suitable decay times in order to guarantee error-free testability even with small quantities used and high moving speeds of the bank note in bank-note processing machines (up to 40 or more bank notes per second). The luminescent component usually constitutes 20% to 80% of the mixture forming the security feature, preferably 25% to 60%, particularly preferably 30% to 50% (all percentages being by weight).

Both the kind of matrix and the kind of dopants contained have a great influence on the spectral properties to be tested as an authenticity criterion. For elevated protection, there can also be used mixtures of several different luminophores in the same or different matrices. For simulating the luminescent component, the composition and doping of the matrix must hence be known, inter alia, to be able to replicate the luminophore. Thus, it is essential to impede an analysis of the stoichiometry via elemental analysis of the feature. It is particularly to be impeded that an analysis is done by elemental analysis methods such as XRF or ICP-AES on the basis of whole bank notes or bank-note scraps, etc., or bank-note ash obtained by ashing bank-note material, in order to draw inferences about the feature composition.

To obtain a camouflage of the chemical elements of the host lattice or matrix of the luminophore that form the luminescent component, there must be added to the security feature, through the camouflaging component, alternatives that are as plausible as possible for the respective individual matrix constituents of the luminophore, in order that an analysis of the security feature yields no certain recognition of which chemical elements are ultimately involved in the build-up of the matrix of the luminophore.

Typically, a luminophore of the luminescent component consists of complex crystalline mixed oxides or mixed oxysulfides having one or more dopings, e.g. of rare earths or transition metals.

An exemplary procedure for camouflaging chemical elements involved in building up the matrix of a luminophore of the security feature shall be illustrated hereinafter.

DE 198 04 021 A1 discloses different luminophores which can form the luminescent component of a security feature. The substance $Y_{2.91}Pr_{0.09}Cr_2Al_3O_{12}$ stated by way of example can be used as a luminescent component of a machine-readable security feature. If for example the ash of a value document containing this security feature is subjected to an elemental analysis, relatively large quantities of yttrium, chromium and aluminum as well as smaller quantities of praseodymium would be detectable as atypical ash constituents. This would suggest the nature of the luminophore (yttrium-chromium-aluminum-oxide, doped with praseodymium), thus facilitating replication of the security feature.

For effectively camouflaging the luminescent component of the security feature, chemical elements must hence form the camouflaging component that are matched with the chemical elements of the luminescent component such that it is no longer evident from the combination of the chemical elements contained in the security feature which of the chemical elements form the luminescent component. "Matched" chemical elements have here a similar structure-chemical behavior, e.g. with regard to ionic radius, charge number, preferred coordination numbers or the tendency to ionic/covalent bonding, through which certain chemical elements can be inserted similarly into structures and interchanged, or form isostructural compounds or homologous mixed series.

For example, yttrium, gadolinium, lanthanum and lutetium usually form isostructural compounds and, being non-luminescent rare earth elements, are often employed as matrix constituents in rare earth-based luminophores. Hence, in the simultaneous presence e.g. of yttrium and gadolinium, even with a certain knowledge of the structure, e.g. that the feature involves a garnet-based luminophore, it is unclear whether only yttrium, only gadolinium, or both together are constituents of the garnet matrix. In case of doubt, concentration series and other variations must hence be synthesized of all three combinations, in order to determine the exact identity of the feature.

Likewise, on the basis of the chemical properties, chromium can often be replaced by iron, whereas aluminum can often be replaced by gallium.

For camouflaging the dopant, in this case praseodymium, further rare earths typically acting as a luminescence center or sensitizer should be added, for example terbium and neodymium. Even if certain details of the luminescent component, such the primary luminescence center (dopant), have already been recognized on the basis of other forms of analysis, e.g. spectral analysis, secondary aspects such as the presence and kind of sensitizers and codopings, which are often utilized, inter alia, to modify lifetimes and excitation bands of the luminophore, thus remain uncertain.

Due to the offer of corresponding alternatives for the remaining elements of the matrix of the luminophore of the luminescent component, the analysis effort grows exponentially through the additionally possible combinations, so that an identification of the security feature through synthesis series is impossible or involves enormous effort.

For the substance $Y_{2.91}Pr_{0.09}Cr_2Al_3O_{12}$ stated hereinabove by way of example, as a luminescent component of a security feature, a possible camouflaging component is given by the substances stated hereinafter (percentages being by weight).

34% $GdGaO_3$
34% $FeAl_2O_4$
1% $Tb_2O_3$
1% $Nd_2O_3$

Thus, the substance $Y_{2.91}Pr_{0.09}Cr_2Al_3O_{12}$ forming the luminescent component is contained in the security feature with a proportion of 30%.

For unmasking the luminescent component, in this example of the matrix constituents consisting of the elements Y, Gd, Ga, Al, Fe and Cr the correct combination would first have to be selected. Then this combination would have to be respectively tested with different combinations of the possible dopants Pr, Nd and Tb. Together with the unknown remaining synthesis parameters (e.g. correct temperature, raw materials, processing, etc.), this constitutes a virtually insurmountable obstacle for a successful replication of the security feature or its luminescent component. As an additional advantage in terms of the intended camouflage, employing $FeAl_2O_4$ also increases the quantity of aluminum in the mixture. Thus, the detected Cr:Al ratio, which lies at 2:3 in the luminescent component, is strongly altered. This produces an additional obstacle for a successful imitation of the security feature. Even if it is correctly assumed that the luminescent component involves a chromium-aluminum mixed oxide, one would think through this change that the correct composition is in a different stoichiometric range with less chromium and more aluminum, or the correct range would no longer be assessable via the chromium-aluminum ratio detected by elemental analysis.

The luminescent component to be camouflaged, or the luminophore, can also be a crystal solid having a microscopically ordered structure, i.e. the atoms of the structure are disposed in a regular manner. Certain ones of these crystal structures are tolerant toward a replacement of one atom type by another, i.e. this does not alter their microscopic order, if certain general rules such as atomic sizes and charge neutrality are respected. Examples of such crystals are spinels, garnets, perovskites, lanthanide oxysulfides, zircons, etc. When certain lattice sites of these crystals are populated by several elements (atoms) in a certain ratio, with said elements influencing the spectral properties of the luminophore, it is expedient to falsify the element ratio of the mixture of the security feature by adding already contained elements. In the exemplary case, the Cr—Al ratio of the compound influences, inter alia, the spectral properties of the luminophore. Adding additional aluminum thus causes this relative ratio to remain unknown even when it has been found out that chromium and aluminum are simultaneously necessary for replicating the security feature. The camouflage of at least one elemental ratio of the feature component is hence a preferred embodiment of the invention.

An exact elemental analysis of the security feature is normally not possible due to the small quantities used in value documents, e.g. bank notes, or the small proportion of the security feature in bank-note ash, or it depends on the exactness of the respective measurement method (e.g. simple XRF with a hand-held unit or professional trace analysis on a synchrotron) and the chemical elements to be detected. Hence, for effective camouflage it is preferred, but not necessary, to add the quantities of the chemical elements of the camouflaging component that are respectively stoichiometrically correct with regard to the luminophore. The chemical elements of the camouflaging components should, however, be present in a proportion of at least 30%, preferably at least 50%, particularly preferably at least 80%, of the molar quantity of the respective luminophore element to be camouflaged. This ensures that the additionally detectable elements of the camouflaging component are also perceived as possible matrix constituents.

For camouflaging dopants contained only in small quantities in the luminophore of the luminescent component, such as luminescence centers or sensitizers, the chemical elements of the camouflaging component are also to be present in the total mixture of the security feature in a proportion of at least 30% of the molar quantity of the dopant to be hidden. In the case of the dopants the amount of the proportion is not critical, however, since relatively arbitrary doping quantities appear as a plausible possibility for the luminescence centers, codopings or sensitizers upon an elemental analysis, as long as the proportions are high enough to be detectable.

Different substances E1, E2, E3, ... for the camouflaging component are preferably chosen such that they involve the chemical elements required for the camouflage in a sufficient quantity to make possible the proportion of an individual substance of the camouflaging component in the total mixture of the security feature in the range of 5 to 60%, preferably 10 to 40% (percentages being by weight). These preferred values respectively hold for substances of the camouflaging component for camouflaging the chemical elements of the matrix of the luminescent component of the security feature. For camouflaging the active dopants employed in the matrix there are preferably chosen different substances D1, D2, ... which are respectively preferably present in a quantity of 0.5 to 4%, particularly preferably 1 to 2%, of the total mixture of the security feature.

A security feature should contain at least 2, preferably at least 3, particularly preferably at least 4, additional chemical elements in the camouflaging component for the chemical elements of the matrix of the luminescent component. A chemical element of a dopant should be camouflaged with at least 1, preferably at least 2, additional chemical elements. Preferably, the ratio of two chemical elements contained in the matrix of the luminescent component is additionally changed by adding a chemical element already present in the matrix.

This is preferably done by selecting at least 1, preferably at least 2, particularly preferably at least 3, substances E1, E2, E3, ... which contain the chemical elements required for camouflaging the chemical elements of the matrix. Additionally by at least 1, preferably at least 2, substances D1, D2, ... for camouflaging the active dopants employed in the matrix. Preferably, one of the substances for camouflaging the elements of the matrix E1, E2, E3, ... additionally contains an element of the matrix in order to hide the element ratio of the matrix. Instead, there can also be added another substance that contains a corresponding element of the matrix, but is formally none of the substances E1, E2, E3, ..., since the other substance contains no further elements of the matrix.

To enable a selection of suitable chemical elements for the respective matrix elements to be camouflaged, suitable elements are hereinafter respectively ordered in groups. One element of a group here can respectively be hidden by another element of the group. Further, sub-groups of elements are stated which are suited especially well for mutual camouflage.

For example, there are great parallels in the respective structure chemistry of the rare earths, so that they are not readily separable from each other even using chemical methods. Hence, they can almost always be interchanged isostructurally in matrices. Thus, {Y, La, Ce, Pr, Nd, Pm, Sm, Eu, Gd, Tb, Er, Tm, Yb, Lu} form a group of alternative elements.

However, it is preferable to employ the sub-groups {Y, La, Ce, Gd, Lu} and {Ce, Pr, Nd, Sm, Eu, Tb, Er, Tm, Yb} for a mutual camouflage, because typical luminophore matrix elements are respectively grouped together in the first sub-group {Y, La, Ce, Gd, Lu} and typical luminescence centers or sensitizers in the second sub-group {Ce, Pr, Nd, Sm, Eu, Tb, Er, Tm, Yb}. This further improves the effect of a mutual camouflage of chemical elements contained in the sub-groups, since their respective preferred fields of application moreover match. Cerium plays a special role here, since it can be utilized both as a matrix element and as a luminescence center or sensitizer, depending on the application, and is hence present in both groups. Promethium plays a special role, since it is not used as a preferred luminophore matrix constituent or as a luminescence center or sensitizer on account of its radioactivity, so that it was not included in either of the sub-groups.

The grouping here conforms to similar structure-chemical properties in crystalline inorganic matrices. For example, the first row of the periodic system contains the elements H, Li, Na, K, Rb, Cs, Fr. However, hydrogen possesses completely different properties in comparison to the other elements and can hence not be used plausibly for their camouflage. On the other hand, it is known that thallium in the third main group can often be inserted in the form of Tl(I) in crystals, analogously with alkali metals, and behaves analogously there. Thus, {Li, Na, K, Rb, Cs, Fr, Tl} form a group of elements, it not being evident in the simultaneous presence of two elements of the group in a security feature, without additional knowledge, whether only the first, the second, or a mixture of the two elements are a constituent of the feature component. {Na, K} form a preferred sub-group here on account of their frequently being employed together.

The possible formation of element groups is not restricted to elements of the same main groups of the periodic system of the elements or elements with the same charge number. For example, the elements {Al, Si, P, S} are very similar with regard to their tendency to form covalent oxygen compounds in tetrahedral coordination. Thus, many examples can be found in which these elements can be interchanged without any great change in structure as long as a charge equilibration takes place. Known examples are zeolites, in which the same skeleton structure of Al and Si in the ratio 1:1 or only of Si (all-silica zeolites) as well as of arbitrary intermediate states with more or less aluminum can be formed. The charge equilibration takes place here e.g. via the quantity of countercations in the zeolite channels. Likewise, phosphorus can e.g. be replaced by silicon and sulfur. For example, both the extremes apatite $Ca_{10}(PO_4)_6F_2$ and ellestadite $Ca_{10}(SiO_4)_3(SO_4)_3F_2$ as well as arbitrary mixed forms of the two compounds can be produced. Structural analogs of zeolites and of certain aluminophosphates ("Al-POs") are likewise well enough known.

A further grouping that is particularly relevant for security features is formed by {Ca, Sr, Ba, Bi, Y, La, Ce, Gd, Lu}, since Ca, Sr, Ba and Bi are the few elements fairly compatible with rare earths in terms of ionic radius and structure chemistry that are used for luminophore matrices. It is known that the insertion of rare earth dopings in luminescent security features takes place almost exclusively in rare earth-containing matrices as well as Ca, Sr, Ba aluminates and silicates, etc., since in other matrices there are usually no suitably large cationic insertion positions. In a rare earth-doped security feature, at least one of these elements is thus present, and the addition of further elements of the group thus considerably impedes the identification of the employed matrix.

Luminescence-based security features are almost exclusively oxides, sulfides or oxysulfides. In the group {O, S, Se, Te}, {O, S} thus assumes a preferred special role for impeding the association with oxide, sulfide or oxysulfide. For example, upon employment of an oxidic feature a sulfur-containing compound can be simultaneously added, in order that after elemental analysis or digestion it is unclear whether the feature involves an oxide, sulfide or oxysulfide. Since sulfides and oxysulfides convert into sulfates upon ashing or upon certain forms of digestion, sulfates can also be added instead of sulfides in order to obtain a corresponding camouflage.

Since oxysulfides often possess an oxygen-sulfur ratio of 2:1 (e.g. $Gd_2O_2S$) and the sulfur content can partly escape in the form of gaseous compounds e.g. upon ashing of the bank notes, camouflage by {O, S} also assumes a special role in terms of quantity.

While for other matrix constituents at least 30%, preferably at least 50%, particularly preferably at least 80%, of the molar proportion of an element of a matrix is added, as already required, a considerably lower proportion is sufficient—for the above-mentioned reasons—in the case of oxidic matrices through addition of sulfur. Therefore, at least 5%, preferably at least 15%, particularly preferably at least 30%, of the molar proportion of oxygen of an oxidic matrix can be camouflaged with sulfur in the form of sulfides, oxysulfides or sulfates.

Further groupings having similar structure-chemical properties due to their positioning in a common main group of the periodic system are the group of alkaline earth metals {Be, Mg, Ca, Sr, Ba, Ra}, with {Ca, Sr, Ba} forming a preferred sub-group here due to their greater similarity. Likewise, {B, Al, Ga, In, Tl} form a group, with {Al, Ga} forming a preferred sub-group. Likewise, {Si, Ge, Sn} form a group, {P, As, Sb} a group, and {F, Cl, Br, I} a group.

The low transition metals of the fourth period of the periodic system possess similar ionic radii and chemical affinities. Specifically luminescent security features can contain absorbent transition metals, there being preferably employed combinations of the elements {Cr, Mn, Fe, Co, Ni}, as is disclosed e.g. partly in WO 81/03507. The elements {Cr, Mn, Fe, Co, Ni} hence form a group.

Further transition metals having very similar structure-chemical properties in inorganic matrices are {Ti, Zr}, {Nb, Ta}, {Mo, W}, {Pd, Pt}, {Zn, Cd}, which likewise form groups.

Besides the above-described components, the security feature can have additional components. From a technical point of view, additional functionalities are often to be met, e.g. the compensation of production fluctuations or a forensic identifiability of the security feature. The additional components do not in all cases have to serve to camouflage the security feature. However, the additional components are preferably selected such that a camouflage of the chemical elements of the luminescent component is likewise made possible besides the required technical function. Likewise, certain additional components, particularly preferably the component for forensic identification, are preferably so chosen that they are likewise camouflaged by the camouflaging component.

A production component is contained in the total mixture of the security feature preferably in a proportion of 0 to 20%, particularly preferably 0 to 10% (all percentages being by weight). When the production component simultaneously serves as camouflage for the chemical elements of the luminescent component, the preferred proportions are accordingly higher, since the production component can then no longer be reduced, for compensating production fluctuations, to low quantitative proportions without endangering the camouflage function. In this case, the preferred proportional quantities hence lie at 25 to 45%, particularly preferably 25 to 35%.

The production component is necessary in terms of production engineering in order to guarantee an unvarying quality or signal intensity of the security feature. Depending on manufacturing conditions such as the employed raw material batches and impurities contained therein, annealing parameters, grinding parameters, etc., there can occur an intensity fluctuation of the luminescence signal of the luminescent component. To compensate such fluctuations, the accordingly required proportion of the production component is added to the mixture forming the security feature, in order to adjust the luminescence signal to a preset standard magnitude. It can thus be achieved that upon use of the security feature, e.g. for manufacturing value documents, the respective metering for incorporating the security feature does not have to be varied even when the above-described production fluctuations occur. Security features stemming from different productions can thus be employed for the manufacture of value documents without adapting manufacturing parameters.

A coding component for a forensic identifiability of the security feature is contained in the mixture preferably in a proportion of 0 to 10%, particularly preferably 0.5 to 5%, very particularly preferably 1 to 3%. The coding component involves a forensic feature by which e.g. different production batches, deliveries, manufacturers or processors can be marked. Preferably, it involves a luminophore. However, the latter does not necessarily have to emit in the non-visible spectral region like the luminescent component, or have spectral properties and decay times that are suitable for machine readability or machine testing. Rather, the machine readability of the luminescent component of the security feature should not be adversely affected by the coding component. Hence, the coding component should preferably differ strongly from the employed luminescent component of the security feature in excitation and emission. Detection of the coding component can be effected via forensic methods, e.g. through the use of a fluorescence microscope or measurement on specialized laboratory setups, etc.

As a coding component there are preferably utilized collapsed zeolite structures loaded with rare earths and/or transition metals, as are described for example in DE 100 56 462 A1. These offer the advantage that zeolites can be loaded with a multiplicity of cations easily via ion exchange. Preferably, there can also be used other crystalline inorganic matrices that are doped with rare earths and/or transition metals. Particularly preferably, the luminescence centers of the coding component involve trivalent rare earth species emitting in the visible, e.g. praseodymium, samarium, europium, terbium and dysprosium, since these possess specific structured emission spectra in the visible spectral region and are thus especially well suited for an unambiguous optical forensic recognition. Preferably, the matrices used here are oxides, e.g. in the form of garnets, spinels or perovskites, as well as oxysulfides, sulfides, silicates, phosphates, aluminates, niobates, tantalates, vanadates, germanates, arsenates, zirconates or wolframates. Examples of such and further substances are described in the prints U.S. Pat. No. 3,980,887, U.S. Pat. No. 4,014,812, U.S. Pat. No. 3,981,819 and WO 2006/047621 A1. In addition to the excitation spectrum or emission spectrum, the life of the luminescence can also be tested.

Preferably, the proportion of rare earth ions and/or transition metals in the coding component is chosen such that it is comparable to the proportion of a rare earth metal and/or transition metal of a dopant of the luminescent component upon elemental analysis of the total mixture of the security feature. Thus, the coding component additionally camouflages the dopant or dopants of the luminescent component. In this case, the use of the substances D1, D2, . . . described above for camouflaging the active dopants can be omitted, or less of the substances D1, D2, . . . be used.

EXAMPLE 1

WO 2011/084663 A2 discloses a security feature in the form of a luminescent component $Y_{2.88}Er_{0.1}Tm_{0.01}Ho_{0.01}Ga_5O_{12}$. The luminescent component thus has a matrix or host lattice having the elements Y, Ga and O. The active dopants are formed by the elements Er, Tm and Ho.

For camouflaging the matrix element Y there can be selected e.g. from the preferred sub-group {Y, La, Ce, Gd, Lu} the element La, and from the group {Ca, Sr, Ba, Bi, Y, La, Ce, Gd, Lu} the element Sr. For camouflaging Ga there can be chosen e.g. from the preferred sub-group {Al, Ga} the element Al. For camouflaging O there can be chosen e.g. from the preferred sub-group {O, S} the element S. For camouflaging the dopants Er, Tm, Ho there can be selected e.g. from the preferred sub-group {Ce, Pr, Nd, Sm, Eu, Tb, Er, Tm, Yb} the elements Yb and Nd.

For incorporating the elements La, Sr, Al, S necessary for camouflaging the matrix (M), it is expedient to use e.g. the compounds lanthanum oxysulfide (E1) and strontium aluminate (E2), since two required elements are respectively combined in one compound here, and the number of blend components should be minimized for reasons of application technology. The camouflage components for the dopants can be used e.g. in the form of the oxides $Yb_2O_3$ (D1) and $Nd_2O_3$ (D2).

Taking into account the above-described required quantities, there results for example the following total mixture for the security feature (percentages being by weight):

| | |
|---|---|
| 33% $Y_{2.88}Er_{0.1}Tm_{0.01}Ho_{0.01}Ga_5O_{12}$ | (M) |
| 50% $La_2O_2S$ | (E1) |
| 15% $SrAl_2O_4$ | (E2) |
| 1% $Yb_2O_3$ | (D1) |
| 1% $Nd_2O_3$ | (D2) |

EXAMPLE 2

EP 1 241 242 A2 discloses a machine-readable security feature: $Gd_{(1-x-y)2}O_2S:Yb_x, Tm_y$, with $0.05 \le x \le 0.80$ and $0.0001 \le y \le 0.10$ From the stated range there is chosen by way of example $Gd_{1.89}Yb_{0.1}Tm_{0.01}O_2S$.

For camouflaging the matrix element Gd there are chosen from the group {Ca, Sr, Ba, Bi, Y, La, Ce, Gd, Lu} the elements Ca, Ba, La and Ce. For camouflaging the dopants Yb and Tm there are chosen from the preferred sub-group {Ce, Pr, Nd, Sm, Eu, Tb, Er, Tm, Yb} the elements Er and Ho. Additionally, the oxygen-sulfur ratio of the security feature is to be distorted by adding additional sulfur. As a technical aid, the mixture is to contain a variable proportion of a production component (P), and a coding component. As a coding component (C) there is chosen a zeolite 5A which, analogously to the description in DE 100 56 462 A1, was ion-exchanged with samarium chloride and subsequently annealed at 1150° C. to obtain a compound having the approximate totals formula $Na_{0.7}Sm_{0.1}AlSiO_4$. The forensic detection of this coding component can be done for example via a luminescence microscope.

The elements Y, Ca, Ba, Ce, S required for camouflaging the matrix and distorting the stoichiometry can be incorporated for example via the compounds $CaAl_2O_4$, $LaB_6$, $Ce_2O_3$, $BaSo_4$. As an additional advantage, Al is hidden in the forensic component here by the boron of the $LaB_6$ (group {B, Al, Ga, In, Tl}), and additional aluminum is introduced by $CaAl_2O_4$ in order to distort the aluminum-silicon ratio of the coding component. Barium sulfate simultaneously forms an elemental camouflage and is employed as a production component. The dopants Yb and Tm are camouflaged by $Er_2O_3$, $Ho_2O_3$ and the samarium content of the coding component.

Taking into account the above-described required quantities, there results for example the following total mixture for the security feature (percentages being by weight):

| | |
|---|---|
| 35% $Gd_{1.89}Yb_{0.1}Tm_{0.01}O_2S$ | (M) |
| 10% $CaAl_2O_4$ | (E1) |
| 10% $LaB_6$ | (E2) |
| 10% $Ce_2O_3$ | (E3) |
| 30% $BaSO_4$ | (E4/P) |
| 2% $Na_{0.7}Sm_{0.1}AlSiO_4$ | (C) |
| 2% $Er_2O_3$ | (D1) |
| 1% $Ho_2O_3$ | (D2) |

EXAMPLE 3

A luminescent component having the composition $LaPO_4{:}Er_{0.1}$ is to be camouflaged. For camouflaging the element La there was selected from the group {Ca, Sr, Ba, Bi, Y, La, Ce, Gd, Lu} Sr. For camouflaging the element P there were selected from the group {Al, Si, P, S} Al and Si. For the element Er there were selected from the preferred sub-group {Ce, Pr, Nd, Sm, Eu, Tb, Er, Tm, Yb} Tm and Yb. The production component used is $TiO_2$. The coding component is $SrAl_2O_4{:}Eu_{0.02}$.

The elements Sr, Al, Si required for camouflaging the elements of the matrix can be made available for example by using $Sr_3(PO_4)_2$ and $NaAlSiO_4$ (zeolite 5A).

Taking into account the above-described required quantities, there results for example the following total mixture for the security feature (percentages being by weight):

| | |
|---|---|
| 35% $La_{0.9}Er_{0.1}PO_4$ | (M) |
| 25% $Sr_3(PO_4)_2$ | (E1) |
| 15% $NaAlSiO_4$ | (E2) |
| 20% $TiO_2$ | (P) |
| 1% $SrAl_2O_4{:}Eu_{0.02}$ | (C) |
| 1% $Tm_2O_3$ | (D1) |
| 3% $Yb_2O_3$ | (D2) |

EXAMPLE 4

DE 10 2006 047852 A1 discloses a luminescent component $YAlO_3{:}Cr_{0.02}$. For camouflaging Y there were chosen from the group {Ca, Sr, Ba, Bi, Y, La, Ce, Gd, Lu} Sr and Gd. For Al there was chosen from the preferred sub-group {Al, Ga} Ga. For camouflaging O there was selected from the preferred sub-group {O, S} S. For camouflaging the doping Cr there were chosen from the group {Cr, Mn, Fe, Co, Ni} Mn and Fe. The coding component is formed by $YAG{:}Tb_{0.01}$.

The elements Sr, Gd, Ga and S required for camouflaging the elements of the matrix can be added e.g. in the form of $Gd_3Ga_5O_{12}$ and $SrSO_4$.

Taking into account the above-described required quantities, there results for example the following total mixture for the security feature (percentages being by weight):

| | |
|---|---|
| 30% $YAl_{0.98}Cr_{0.02}O_3$ | (M) |
| 25% $Gd_3Ga_5O_{12}$ | (E1) |
| 40% $SrSO_4$ | (E2/P) |
| 3% $Y_{2.99}Tb_{0.01}Al_5O_{12}$ | (C) |
| 1% MnO | (D1) |
| 1% $Fe_2O_3$ | (D2) |

The invention claimed is:

1. A security feature having
a luminescent component having at least one luminophore consisting of at least one doped host lattice, and
a component camouflaging the luminescent component,
wherein the camouflaging component has chemical elements that have similar structure-chemical properties to the chemical elements of the luminescent component,
wherein the chemical elements of the camouflaging component and the chemical elements of the luminescent component are formed by different chemical elements,
wherein the camouflaging component contains at least two additional chemical elements that have similar structure-chemical properties to the chemical elements of the host lattice, and contains at least one additional chemical elements that have similar structure-chemical properties to the chemical elements of a dopant employed for doping the host lattice,
wherein the camouflaging component contains at least one substance for camouflaging the chemical elements of the host lattice, and at least one substance for camouflaging the employed dopant.

2. The security feature according to claim 1, wherein each of the substances for camouflaging the chemical elements of the host lattice has a proportion of 5% to 60% in the security feature, and has the additional chemical elements in a proportion of at least 30% of the molar quantity of the respective chemical element of the host lattice to be camouflaged.

3. The security feature according to claim 1, wherein at least one of the substances for camouflaging the chemical elements of the host lattice additionally contains a chemical element of the host lattice in order to hide the element ratio of the host lattice, and that additionally or instead there is contained another substance that contains a chemical element of the host lattice in order to hide the element ratio of the host lattice.

4. The security feature according to claim 1, wherein the chemical elements of the camouflaging component and the chemical elements of the luminescent component belong to a group {Y, La, Ce, Pr, Nd, Pm, Sm, Eu, Gd, Tb, Er, Tm, Yb, Lu} of chemical elements.

5. The security feature according to claim 4, wherein the chemical elements of the host lattice and the chemical elements camouflaging them belong to a sub-group {Y, La, Ce, Gd, Lu}, whereas the chemical elements of the dopant and the chemical elements camouflaging them belong to a sub-group {Ce, Pr, Nd, Sm, Eu, Tb, Er, Tm, Yb}.

6. The security feature according to claim 1, wherein the chemical elements of the camouflaging component and the chemical elements of the luminescent component are selected from a group of chemical elements consisting of the groups {Li, Na, K, Rb, Cs, Fr, Tl};
{Al, Si, P, S};
{Ca, Sr, Ba, Bi, Y, La, Ce, Gd, Lu};
{O, S, Se, Te};
{Be, Mg, Ca, Sr, Ba, Ra};
{B, Al, Ga, In, Tl};
{Si, Ge, Sn};
{P, As, Sb};
{F, Cl, Br, I};
{Cr, Mn, Fe, Co, Ni};
{Ti, Zr};
{Nb, Ta};
{Mo, W};
{Pd, Pt};
and {Zn, Cd}.

7. The security feature according to claim 1, wherein the security feature has a production component, for adjusting the signal intensity of the luminescence of the luminescent component by compensating for intensity fluctuations of the luminescent component.

8. The security feature according to claim 7, wherein the chemical elements of the production component have similar structure-chemical properties to the chemical elements of the luminescent component.

9. The security feature according to claim 1, wherein the security feature has a coding component, for forensically marking the security feature.

10. The security feature according to claim 9, wherein the chemical elements of the coding component have similar structure-chemical properties to the chemical elements of the luminescent component.

11. A value document having a security feature according to claim 1, wherein the value document consists of paper and/or plastic.

12. The value document according to claim 11, wherein the security feature is incorporated into the volume of the value document and/or applied to the value document.

13. The value document according to claim 11, wherein the security feature is applied to the value document as an invisible, at least partial coating.

14. The security feature according to claim 1, wherein the chemical elements of the camouflaging component and the chemical elements of the luminescent component are selected from a group of chemical elements consisting of O and S.

15. The security feature according to claim 1, wherein the chemical elements of the camouflaging component and the chemical elements of the luminescent component are selected from a group of chemical elements consisting of Ca, Sr and Ba.

16. The security feature according to claim 1, wherein the chemical elements of the camouflaging component and the chemical elements of the luminescent component are selected from a group of chemical elements consisting of Al and Ga.

* * * * *